Aug. 8, 1944.  W. A. TRIPP  2,355,403
TERMINATOR
Filed Oct. 28, 1942
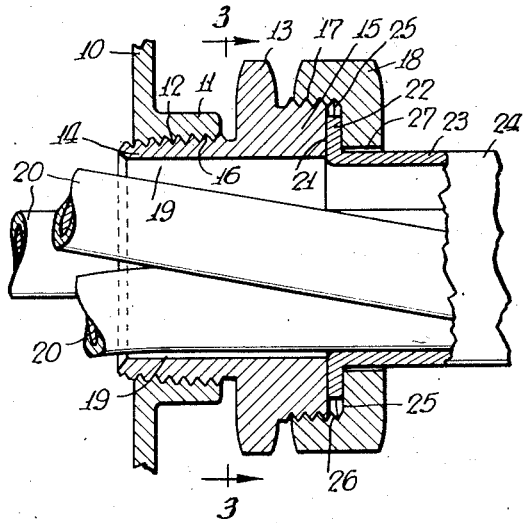
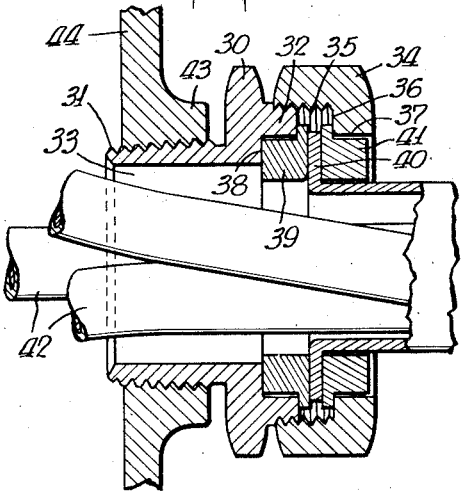
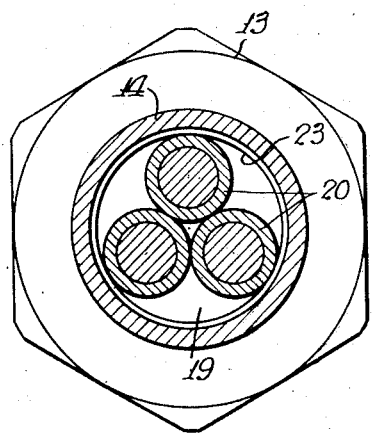
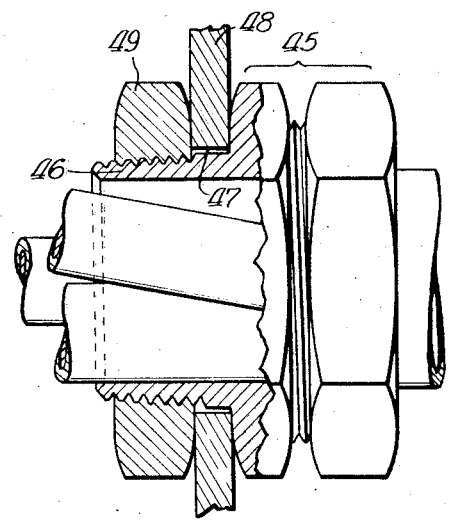
INVENTOR
William Anthony Tripp
BY
Harry Ernest Rubens
ATTORNEY Patented Aug. 8, 1944

2,355,403

UNITED STATES PATENT OFFICE 2,355,403

TERMINATOR

William Anthony Tripp, Boston, Mass.

Application October 28, 1942, Serial No. 463,646

2 Claims. (Cl. 285—6.5)

This invention relates to a terminator, and more particularly to a cable entrance bushing for connecting a sheathed electrical conductor through the wall of an enclosure.

Among the objects of my invention are to provide a simple but effective assembly which furnishes in itself a complete termination for a cable without the cooperation of any other devices or parts thereof; to provide a terminator having a standard male pipe thread for attachment to any enclosure of another device to which it is desired to connect the cable; to provide a terminator which grips the cable sheath in a manner which renders the connection water-tight and at the same time provides a positive support for a reasonable length of cable without axial compression of the sheath, while the threaded portion can be made up tight into the device to which the cable attaches thereby carrying out any water-tight features embodied in such device; to provide a terminator which can be attached to an enclosure having a knock-out or drilled hole in a sheet metal wall, by means of a standard locknut fitting; to provide a terminator capable of providing for a wide variety of cable sizes in a single size of terminator body, by the variation in the bore of an interchangeable clamping ring; to provide a terminator that can be attached to an enclosure which may not be specially designed to engage the terminator; and to provide a terminator having both terminating and supporting functions.

I accomplish these and other objects and obtain my new results as will be apparent from the device described in the following specification, particularly pointed out in the claims, and illustrated in the accompanying drawing, in which:

Fig. 1 is a longitudinally sectioned view of my terminator attaching and supporting a sheathed cable to an enclosure provided with a conduit hub.

Fig. 2 is a longitudinally sectioned view of a modification thereof attached to an enclosure provided with a threaded boss.

Fig. 3 is a cross-sectional view of the device illustrated in Fig. 1 taken in the plane indicated by the line 3—3.

Fig. 4 is a partially sectioned longitudinal view of my terminator attached to a sheet metal enclosure wall.

In the drawing, reference numeral 10 designates an enclosure wall provided with a conduit hub 11, threaded as at 12. Into the threaded conduit hub is inserted my terminator, which comprises in part the tubular collar 13, preferably polygonal-edged, having longitudinally extending shoulders 14 and 15. Shoulder 14 is provided with a standard male pipe thread 16 for engagement with the threads 12 of the conduit hub 11. Shoulder 15 is similarly provided with threads 17 for engagement with a compression nut 18.

The collar 13 contains a longitudinally extending axial bore 19 for entrance of the cable conductors 20. The extending shoulder 15 is provided with a seat 21 for the outwardly flared end 22 of the sheath 23 of the cable 24.

The compression nut 18 has a seat 25 at the base of the threaded recess 26 in juxtaposition to seat 21 of the collar 13, for accommodating the end of the sheath 23. A bore 27 extends axially through the compression nut 18, and has a diameter sufficient to accommodate the sheathed cable. By outwardly flaring the sheath 23, before passage through the collar 13, the maximum sized conductors may be accommodated in the tubular portion 29 of the collar.

In Fig. 2, I illustrate a terminator employing clamping rings, the center bores of which may be reamed out to accommodate any size cable within the conductor capacity of the collar bore. In this figure, the collar 30 is provided with extending threaded sections 31 and 32, bore 33, compression nut 34 with threaded recess 35, seat 36 and bore 37 corresponding to like parts in Fig. 1. A recess 38 is additionally provided for centering the clamping ring 39 against which the cable sheath 40 is compressed by a corresponding clamping ring 41 positioned in recess 35 of the compression nut 34. I may also insert a resilient washer between clamping ring 39 and recess 38 or omit clamping ring 39, and make such other changes as seem desirable depending on various considerations and conditions.

As previously explained, the inner diameters of the clamping rings may be increased to a diameter sufficient to allow the conductors 42 to be comfortably carried in the collar bore 33. Thus, only the bores of the clamping rings need be changed for changes in cable diameters.

Fig. 2 further illustrates a threaded boss 43 for attachment of the terminator to the enclosure wall 44.

In Fig. 4, I have illustrated a terminator 45 provided with threaded section 46 extending through the aperture 47 of enclosure wall 48 and secured thereto by locknut 49. Resilient washers, not shown, may be interposed between the terminator and the enclosure wall to secure maximum waterproof protection.

In all the modifications illustrated, I prefer to assemble my terminator parts loosely to the cable. Thereafter the extending end of the terminator with cable attached thereto is threaded as a unit to the conduit hub or threaded boss, or merely inserted through the apertured enclosure wall and secured thereto by a locknut. The compression nut is then tightened to the collar securing the parts firmly together.

From the foregoing, it is apparent that I have provided a simple and effective assembly for accomplishing the desired results employing a minimum number of parts. The cable sheath is gripped in a manner which renders the joint water-tight, and additionally provides a positive support for a reasonable length of cable without undue stress on the sheath. Moreover, the threaded portion may be made up tight to the enclosure wall, thereby carrying out any water-tight features embodied in the enclosure.

Being a standard pipe thread, the threaded portion can be attached directly without requiring any change or accessory, to any device having a threaded conduit hub.

Alternately, where the enclosures have blank bosses provided for attachment of such connecting devices, my cable terminator can be attached to such merely by drilling and tapping a female thread into such a boss. An incidental advantage in connection with conduit hubs is that more conductor capacity can be passed through the same size conduit hub with my terminator than can ordinarily be passed with the usual type of conduit and wire connectors. This advantage is greater than appears at first glance, because most manufacturers of standard devices usually provide conduit hubs of limited and definitely inadequate size, rendering the supply of adequate cable capacity a difficult task. My terminator will provide for adequate conductor capacity in such installations. Where the enclosure wall provides a simple knock-out, a standard locknut fitting may be used to attach my terminator thereto.

Furthermore, I provide sufficient supporting strength without axially compressing the cable which may damage it. In addition, by providing one or more clamping rings, a range of sizes of sheathed cable may be accommodated by merely reaming the bore of the ring to the desired size.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained, and new results accomplished, as it is obvious that the particular embodiments herein shown and described are only some of the many that can be employed to attain these objects and accomplish these results.

What I claim and desire to secure by Letters Patent is as follows:

1. A terminator for mechanically gripping and sealing the sheath of an electric cable to an apertured enclosure, the end of which sheath is bent to form a flange, comprising a tubular collar provided with a longitudinally extending threaded section at each end thereof, one threaded section having a standard male pipe thread for attachment to the apertured enclosure, and the other threaded section having a seat for receiving the flanged end of the sheath, and a compression nut threaded for engagement with the seated and threaded end of the tubular collar and having an internal shoulder forming a seat for receiving the flanged end of the sheath, said seats cooperating to simultaneously clamp and support the flanged end of the cable sheath upon taking up on the engaging threads of the compression nut and the tubular collar, thereby sealing the sheath to the apertured enclosure with the electric cable extending through the tubular collar and the aperture of the enclosure.

2. A terminator for mechanically gripping and sealing the sheath of an electric cable to an apertured enclosure, the end of which sheath is bent to form a flange, comprising a tubular collar provided with a longitudinally extending threaded section at each end thereof, one threaded section having a standard male pipe thread for attachment to the apertured enclosure, and the other threaded section having a recess for receiving a clamping ring; a compression nut threaded for engagement with the recessed and threaded end of the tubular collar and having an internal shoulder for engaging a clamping ring; and a pair of oppositely positioned clamping rings, one located in the recess of the tubular collar and one located in engagement with the internal shoulder of the compression nut, the clamping ring positioned in the compression nut having a central opening large enough to permit the unflanged cable sheath to be inserted therein; the opposing faces of the said clamping rings forming seats for receiving the flanged end of the cable sheath, said seats cooperating to simultaneously clamp and support the flanged end of the cable sheath upon taking up on the engaging threads of the compression nut and the tubular collar, thereby sealing the cable sheath to the apertured enclosure, with the electric cable extending through the tubular collar and the aperture of the enclosure.

WILLIAM ANTHONY TRIPP.